(12) United States Patent
Gustave Ginetti (10) Patent No.: US 11,893,335 B1
(45) Date of Patent: Feb. 6, 2024

(54) SYSTEM AND METHOD FOR ROUTING IN AN ELECTRONIC DESIGN

(71) Applicant: Cadence Design Systems, Inc., San Jose, CA (US)

(72) Inventor: Arnold Jean Marie Gustave Ginetti, Antibes (FR)

(73) Assignee: Cadence Design Systems, Inc., San Jose, CA (US)

(*) Notice: Subject to any disclaimer, the term of this patent is extended or adjusted under 35 U.S.C. 154(b) by 131 days.

(21) Appl. No.: 17/477,855

(22) Filed: Sep. 17, 2021

(51) Int. Cl.
*G06F 30/394* (2020.01)
*G06F 30/31* (2020.01)
*G06F 30/392* (2020.01)
*G06F 111/20* (2020.01)

(52) U.S. Cl.
CPC ........... *G06F 30/394* (2020.01); *G06F 30/31* (2020.01); *G06F 30/392* (2020.01); *G06F 2111/20* (2020.01)

(58) Field of Classification Search
CPC .................................................... G06F 30/394
USPC ........................................................ 716/126
See application file for complete search history.

(56) References Cited

U.S. PATENT DOCUMENTS

| | | | | |
|---|---|---|---|---|
| 2003/0131323 A1* | 7/2003 | McConaghy | ........... | G06F 30/36 716/132 |
| 2015/0067632 A1* | 3/2015 | Chen | ..................... | G06F 30/394 716/129 |
| 2017/0169146 A1* | 6/2017 | Chen | ..................... | G06F 30/394 |

* cited by examiner

*Primary Examiner* — Eric D Lee
(74) *Attorney, Agent, or Firm* — Mark H. Whittenberger; Holland & Knight LLP (57) ABSTRACT

Embodiments include herein are directed towards a method for electronic circuit design. Embodiments may include receiving a selection of an instance associated with an electronic design at an electronic design schematic displayed on a graphical user interface. Embodiments may also include selecting a corresponding instance within an electronic design layout displayed on a graphical user interface. Embodiments may further include receiving a selection of a source topology and routing at the electronic design layout displayed on the graphical user interface, based upon at least in part, the source topology.

20 Claims, 14 Drawing Sheets

SYSTEM AND METHOD FOR ROUTING IN AN ELECTRONIC DESIGN

FIELD OF INVENTION

The present disclosure relates to a method of electronic circuit design, and more particularly, to a method of routing in an electronic designs.

BACKGROUND

Electronic design applications exist that support custom analog, digital, and mixed-signal designs at the device, cell, block, and chip levels. Full custom digital designs may contain many variants of one or more logical cells (e.g., NAND2, NAND3, NOR3, etc.). All of these variants have different device gate lengths and widths associated therewith. In existing systems the user has to manually place and route all of the devices within all those cells and the routing between each device must respect some topology. Even assuming an acceptable placement, the routing is tedious, time consuming and error prone. Fully automatic routing is unacceptable as it needs to respect user topologies.

SUMMARY

In one or more embodiments of the present disclosure, a computer-implemented method for electronic circuit design is provided. The method may include receiving a selection of an instance associated with an electronic design at an electronic design schematic displayed on a graphical user interface. The method may also include automatically selecting a corresponding instance within an electronic design layout displayed on a graphical user interface. The method may further include receiving a selection of a source topology and routing at the electronic design layout displayed on the graphical user interface, based upon at least in part, the source topology.

One or more of the following features may be included. In some embodiments, routing may include determining an equivalence between a source layout and a target layout. The method may include analyzing layout routing topology to determine that only paths, path segments, and vias are included. The method may further include automatically extracting a routing topology prior to routing. In some embodiments, automatically extracting the routing topology may include converting a path into one or more path segments. Automatically extracting the routing topology may include merging co-linear overlapping path segments. Automatically extracting the routing topology may include truncating path segments. Automatically extracting the routing topology may include trimming or splitting one or more horizontal or vertical path segments. Automatically extracting the routing topology may include extracting one or more path segments and via anchors. The method may further include analyzing an alignment of source and target pins.

In one or more embodiments of the present disclosure a computer-readable storage medium having stored thereon instructions, which when executed by a processor result in one or more operations is provided. Operations may include receiving a selection of an instance associated with an electronic design at an electronic design schematic displayed on a graphical user interface. Operations may also include automatically selecting a corresponding instance within an electronic design layout displayed on a graphical user interface. Operations may further include receiving a selection of a source topology and routing at the electronic design layout displayed on the graphical user interface, based upon at least in part, the source topology.

One or more of the following features may be included. In some embodiments, routing may include determining an equivalence between a source layout and a target layout. Operations may include analyzing layout routing topology to determine that only paths, path segments, and vias are included. Operations may further include automatically extracting a routing topology prior to routing. In some embodiments, automatically extracting the routing topology may include converting a path into one or more path segments. Automatically extracting the routing topology may include merging co-linear overlapping path segments. Automatically extracting the routing topology may include truncating path segments. Automatically extracting the routing topology may include trimming or splitting one or more horizontal or vertical path segments. Automatically extracting the routing topology may include extracting one or more path segments and via anchors. Operations may further include analyzing an alignment of source and target pins.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 6A-D is a diagram showing an equivalent layout associated with a routing process according to an embodiment of the present disclosure;

FIG. 7A-D is a diagram showing an equivalent layout associated with a routing process according to an embodiment of the present disclosure;

FIG. 8A-E is a diagram showing the extraction of a routing topology associated with a routing process according to an embodiment of the present disclosure;

FIGS. 9A-B, 10A-B and 11A-B show diagrams showing the extraction of a routing topology associated with a routing process according to an embodiment of the present disclosure; and FIGS. 12A-D, 13A-B and 14A-G show diagrams showing examples of routing processes associated with a routing process according to an embodiment of the present disclosure.

DETAILED DESCRIPTION

Embodiments of the present disclosure are directed towards a device level, topology driven, routing process. Accordingly, the routing process described herein may allow a user to capture different topologies as a real layout. In this way, when facing a new layout to place and route, the user may only need to select the different devices making a logical cell (e.g., the four devices making a NAND2 cell), specify the routing topology he or she wants to re-use (e.g., by specifying the layout storing that topology), and then initiate the routing process described herein. In turn, embodiments of the present disclosure may be used to extract the topology from the specified layout, and may strictly follow it to route the new layout, automatically adjusting the wire width and the pin width as necessary.

Reference will now be made in detail to the embodiments of the present disclosure, examples of which are illustrated in the accompanying drawings. The present disclosure may, however, be embodied in many different forms and should not be construed as being limited to the embodiments set forth herein; rather, these embodiments are provided so that this disclosure will be thorough and complete, and will fully convey the concept of the present disclosure to those skilled in the art. In the drawings, the thicknesses of layers and regions may be exaggerated for clarity. Like reference numerals in the drawings may denote like elements.

Figure 1:
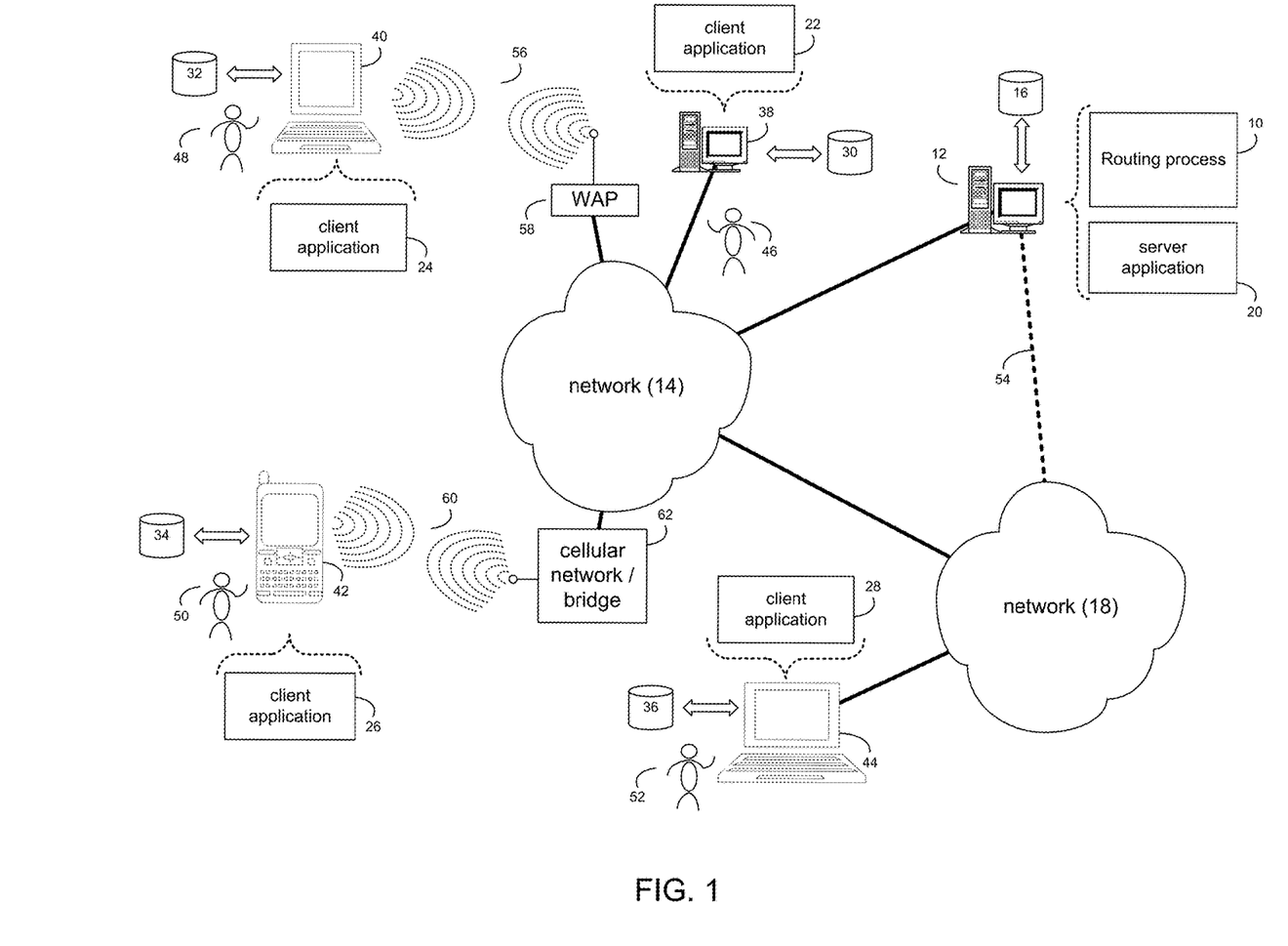
FIG. 1 diagrammatically depicts a routing process coupled to a distributed computing network.

Referring to FIG. 1, there is shown a routing process 10 that may reside on and may be executed by server computer 12, which may be connected to network 14 (e.g., the internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example. Additionally and/or alternatively, routing process 10 may reside on a client electronic device, such as a personal computer, notebook computer, personal digital assistant, or the like.

The instruction sets and subroutines of routing process 10, which may be stored on storage device 16 coupled to server computer 12, may be executed by one or more processors (not shown) and one or more memory architectures (not shown) incorporated into server computer 12. Storage device 16 may include but is not limited to: a hard disk drive; a tape drive; an optical drive; a RAID array; a random access memory (RAM); and a read-only memory (ROM).

Server computer 12 may execute a web server application, examples of which may include but are not limited to: Microsoft IIS™, Novell Webserver™, or Apache Webserver™, that allows for HTTP (i.e., HyperText Transfer Protocol) access to server computer 12 via network 14. Network 14 may be connected to one or more secondary networks (e.g., network 18), examples of which may include but are not limited to: a local area network; a wide area network; or an intranet, for example.

Server computer 12 may execute one or more server applications (e.g., server application 20), examples of which may include but are not limited to, e.g., Lotus Domino™Server and Microsoft Exchange™Server. Server application 20 may interact with one or more client applications (e.g., client applications 22, 24, 26, 28) in order to execute routing process 10. Examples of client applications 22, 24, 26, 28 may include, but are not limited to, design verification tools such as those available from the assignee of the present disclosure. These applications may also be executed by server computer 12. In some embodiments, routing process 10 may be a stand-alone application that interfaces with server application 20 or may be an applet/application that is executed within server application 20.

The instruction sets and subroutines of server application 20, which may be stored on storage device 16 coupled to server computer 12, may be executed by one or more processors (not shown) and one or more memory architectures (not shown) incorporated into server computer 12.

As mentioned above, in addition/as an alternative to being a server-based application residing on server computer 12, the routing process may be a client-side application (not shown) residing on one or more client electronic devices 38, 40, 42, 44 (e.g., stored on storage devices 32, 34, 36, respectively). As such, the routing process may be a stand-alone application that interfaces with a client application (e.g., client applications 22, 24, 26, 28), or may be an applet/application that is executed within a client application. As such, the routing process may be a client-side process, a server-side process, or a hybrid client-side/server-side process, which may be executed, in whole or in part, by server computer 12, or one or more of client electronic devices 38, 40, 42, 44.

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID arrays; random access memories (RAM); read-only memories (ROM), compact flash (CF) storage devices, secure digital (SD) storage devices, and memory stick storage devices. Examples of client electronic devices 38, 40, 42, 44 may include, but are not limited to, personal computer 38, laptop computer 40, personal digital assistant 42, notebook computer 44, a data-enabled, cellular telephone (not shown), and a dedicated network device (not shown), for example. Using client applications 22, 24, 26, 28, users 46, 48, 50, 52 may utilize formal analysis, testbench simulation, and/or hybrid technology features verify a particular integrated circuit design.

Users 46, 48, 50, 52 may access server application 20 directly through the device on which the client application (e.g., client applications 22, 24, 26, 28) is executed, namely client electronic devices 38, 40, 42, 44, for example. Users 46, 48, 50, 52 may access server application 20 directly through network 14 or through secondary network 18. Further, server computer 12 (e.g., the computer that executes server application 20) may be connected to network 14 through secondary network 18, as illustrated with phantom link line 54.

In some embodiments, routing process 10 may be a cloud-based process as any or all of the operations described herein may occur, in whole, or in part, in the cloud or as part of a cloud-based system. The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (CSMA/CA) for path sharing. The various 802.11x specifications may use phase-shift keying (PSK) modulation or complementary code keying (CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, Apple iOS, ANDROID, or a custom operating system.

Figure 2:
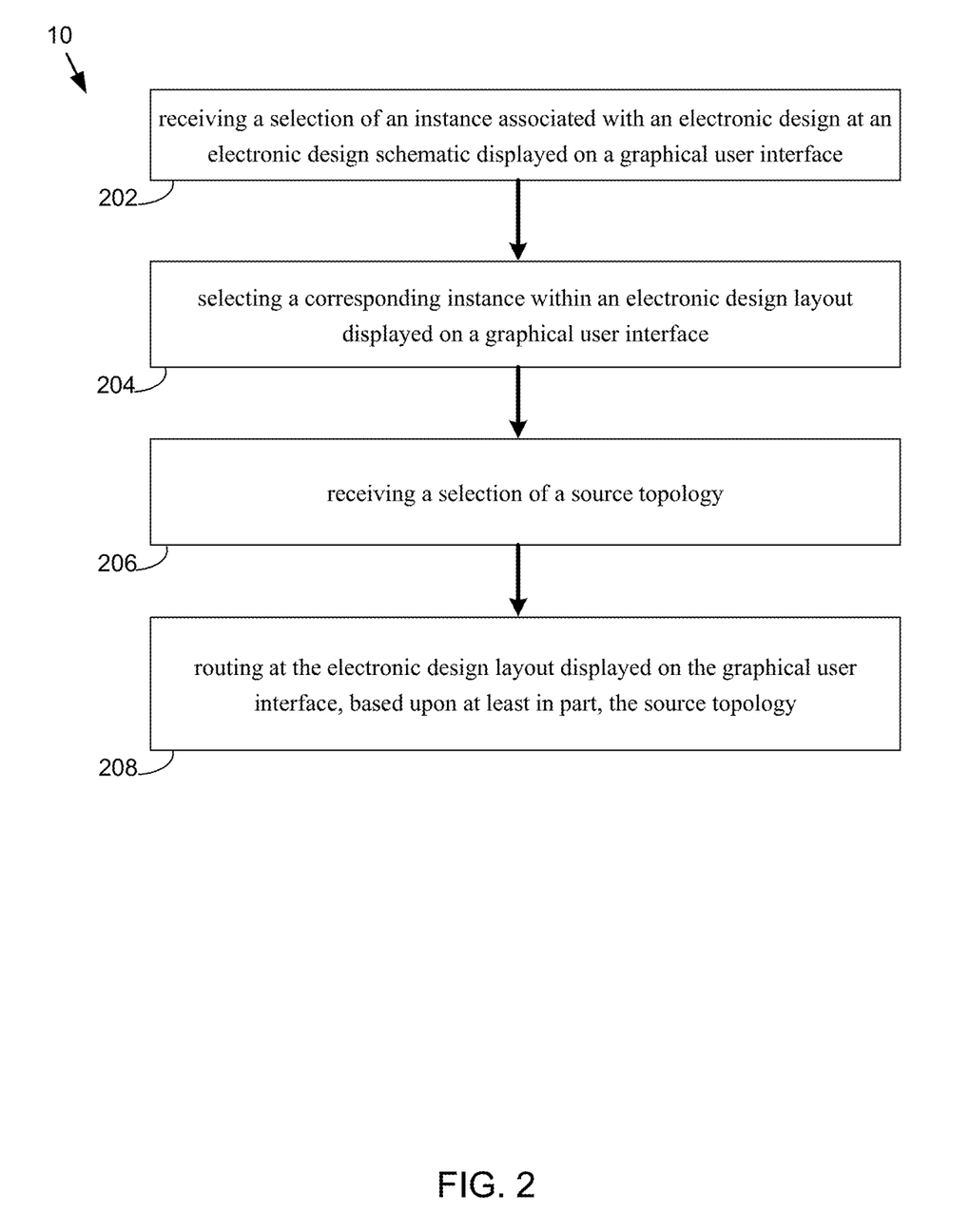
FIG. 2 is an exemplary flowchart of a routing process according to an embodiment of the present disclosure.

Referring now to FIG. 2, a flowchart depicting an embodiment consistent with routing process 10 is provided. Embodiments may include receiving 202 a selection of an instance associated with an electronic design at an electronic design schematic displayed on a graphical user interface. The method may also include automatically selecting 204 a corresponding instance within an electronic design layout displayed on a graphical user interface. The method may further include receiving 206 a selection of a source topology and routing 208 at the electronic design layout displayed on the graphical user interface, based upon at least in part, the source topology. Numerous other operations are also within the scope of the present disclosure.

Figure 3:
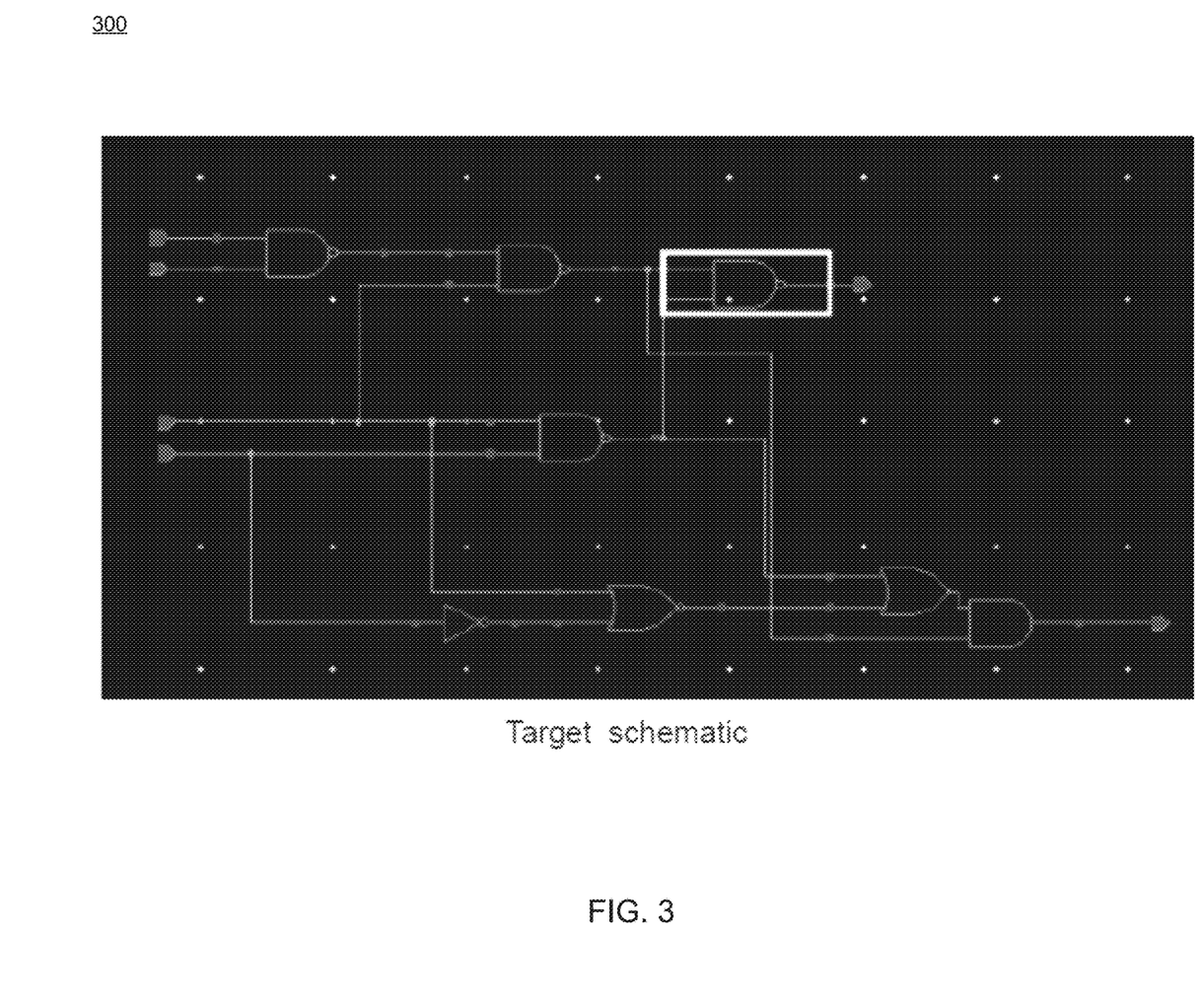
FIG. 3 is a graphical user interface showing a target schematic associated with a routing process according to an embodiment of the present disclosure.
Figure 4:
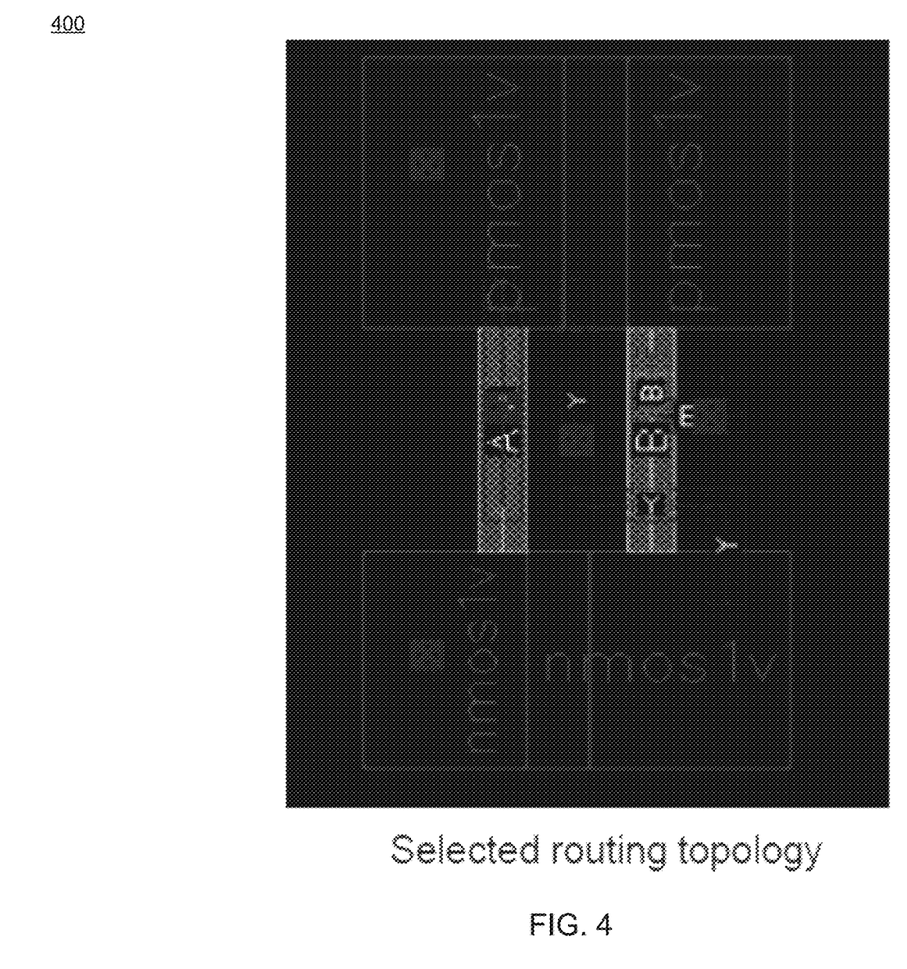
FIG. 4 is a graphical user interface showing a target layout associated with a routing process according to an embodiment of the present disclosure.
Figure 5:
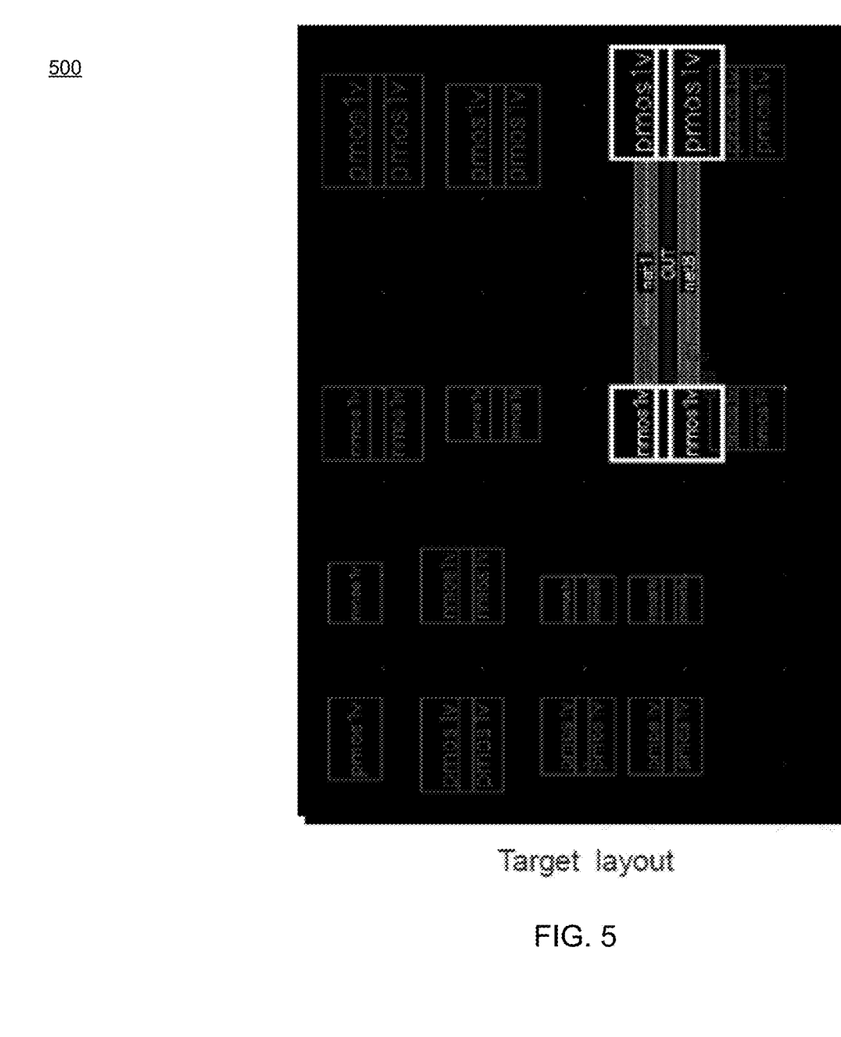
FIG. 5 is a graphical user interface showing a selected routing topology associated with a routing process according to an embodiment of the present disclosure.
Figure 6A:
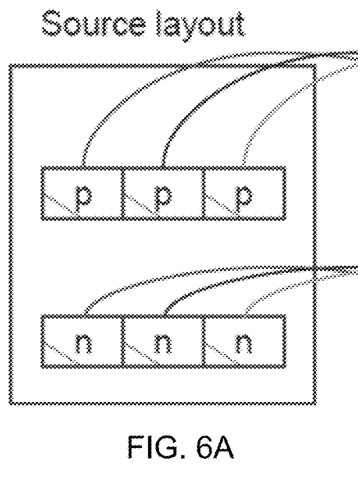
Figure 6B:
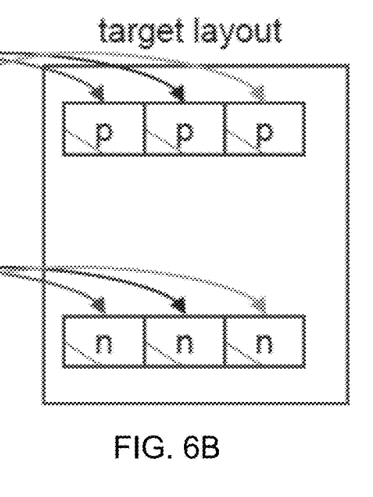
Figure 6C:
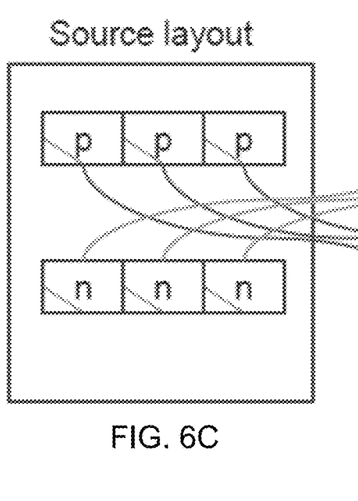
Figure 6D:
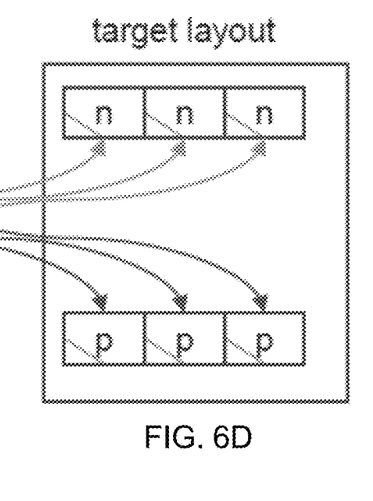
Figure 7A:
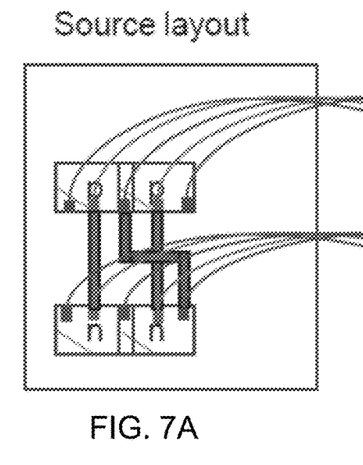
Figure 7B:
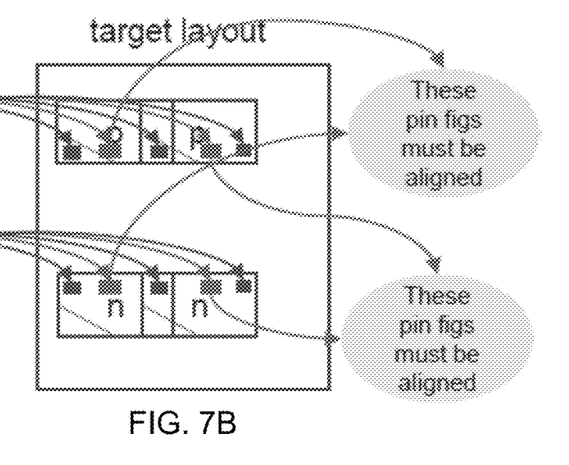
Figure 7C:
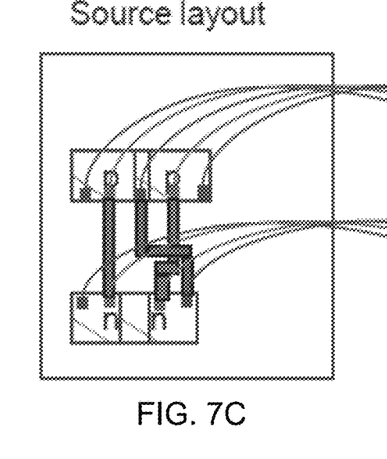
Figure 7D:
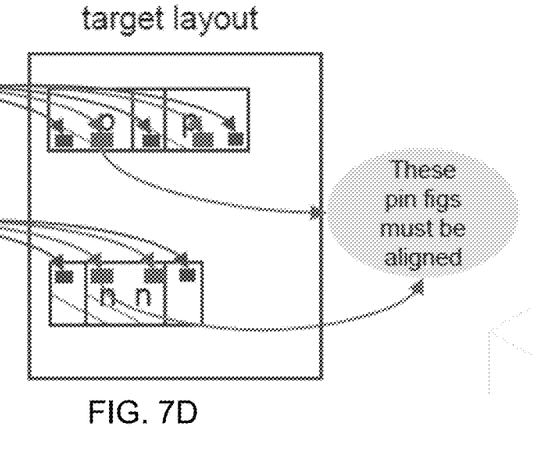
Figure 8A:
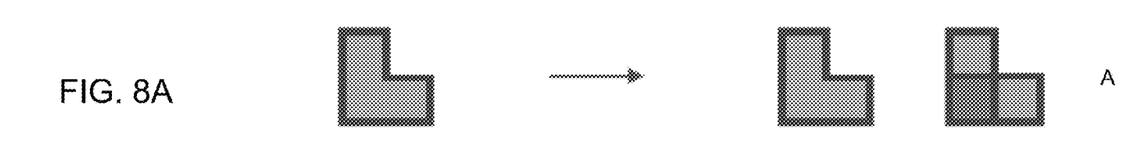
Figure 8B:
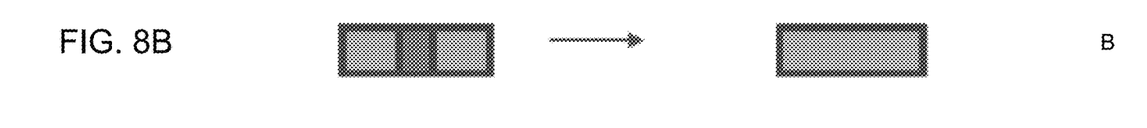
Figure 8C:
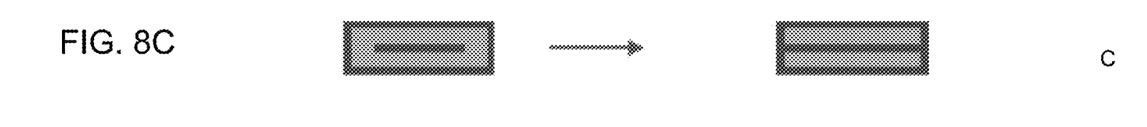
Figure 8D:
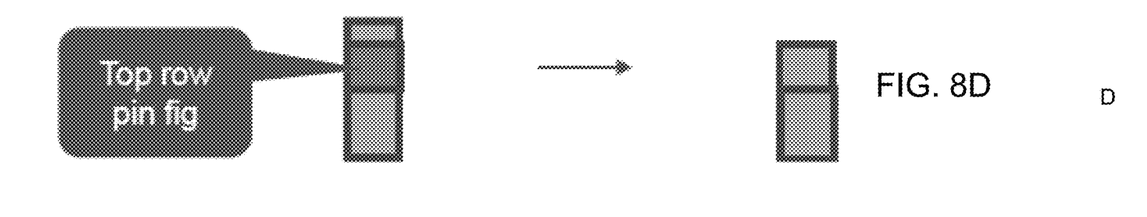
Figure 8E:
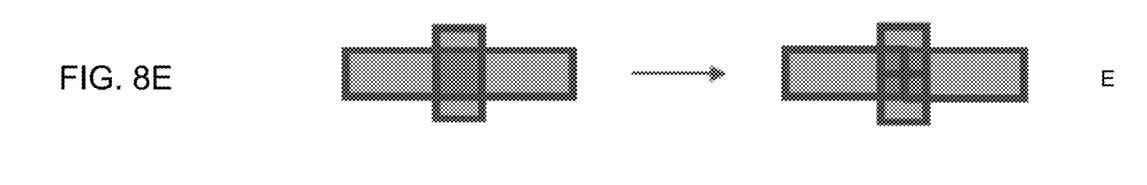

Referring now to FIGS. 3-5, various graphical interfaces are shown consistent with embodiments of the present disclosure. FIG. 3 displays an example of a target schematic, FIG. 4 displays an example of a selected routing topology, and FIG. 5 displays an example of a target layout. The phrase "routing topology", as used herein, may refer to the way a set of instance pin figs are physically connected together. The phrase "pin fig", as used herein, may refer to a piece of geometry within a cell, that may be used to connect to the external world. For example, if a C cell has a logical terminal named A. Together with that logical A terminal there should be a piece of geometry. In this example, the piece of geometry may be on a metal layer or on a poly layer. When the C cell is instantiated within a top cell, it may create an I instance of the C cell. The process may logically connect the A terminal of the I instance to some top level N net. When the N net is routed, it may be necessary to create some top level geometry "touching" the pin fig corresponding to the A terminal.

In some embodiments, the physical connection associated with routing process 10 may be performed with the assistance of horizontal and vertical segments of different layers as well as vias. It should be noted that full custom digital design contains many variants of each logical cell. These variants may have different device gate lengths and widths.

In operation, the user may want to define different routing topologies for different types of gates. For example, different routing topologies for a NAND2 gate, different routing topologies for a NAND3 gate, etc. The user may select one or more devices of a logical gate in the target layout, select a routing topology, and expect the router to route the selected devices with same routing topology. In some embodiments, each segment may be sized according to the gate width.

Referring now to FIG. 6, an embodiment showing an example for determining layout equivalence is provided. More specifically, FIG. 6 depicts an example for determining instance equivalence. A device component type (e.g., nmos, pmos) may be read from a technology file. In some embodiments, one or more of the following assumptions may be made in accordance with routing process 10. A source layout may be composed of two rows of the same number of devices where one row is only composed of nmos devices and one row is only composed of pmos devices. The target layout may be composed of two rows of the same number of devices where one row is only composed of nmos devices and one row is only composed of pmos devices. The target layout may include the same number of devices as the source layout and the target layout may be flipped with respect to the source layout. The $i^{th}$ instance of the pmos (nmos) row of the target layout may correspond to the $i^{th}$ instance of the pmos (nmos) row of source layout. It should be noted that there are no constraints on row spacing as the target layout row spacing may be different than the source layout row spacing. There are no constraints on instance naming as target layout instances may be named differently from the source layout instances. There are no constraints on instance alignment or on gate width/length within a row. Source layout aligned pins may be connected via a straight segment that may be aligned in the target layout.

Referring now to FIG. 7, an embodiment showing an example for determining layout equivalence is provided. More specifically, FIG. 7 depicts an example for determining pin fig equivalence. In some embodiments, one or more of the following assumptions may be made in accordance with routing process 10. As shown in the figure, certain pin figs must be aligned properly for routing process 10 to operate correctly. It should be noted that any overlapping source/drain pin fig may not be double counted as one of the two overlapping pin figs may be ignored. The target layout pmos (nmos) row should have the same number of pin figs as the source layout pmos (nmos) row. The $i^{th}$ pin fig of the pmos (nmos) row of target layout may correspond to the $i^{th}$ pin fig of the pmos (nmos) row of source layout, and may be on the same layer. Physically connected source layout pin figs which are aligned may correspond to aligned target layout pin figs. The router may not introduce any jog on a straight connection. Here, the router respects the source topology. If two source pins are aligned and connected with a vertical segment, then the corresponding target pins should be aligned, otherwise, it may not be possible to connect them using only a vertical segment. This may include at least two vertical segments and one or more horizontal segments (referred to herein as a jog).

In some embodiments, routing process 10 may perform a variety of operations. These may include determining layout equivalence as discussed above and determining the layout topology. For example, this may include, but is not limited to, determining that the layout only contains paths, path segments, and vias. As used herein, a "vertical segment" may refer to a vertical rectangle on a manufacturable layer. A "horizontal segment" may refer to a horizontal rectangle on a manufacturable layer. A via may refer to a set of three shapes, namely, a lower layer shape, an upper layer shape and an intermediate layer shape. The three shapes may overlap each other and the intermediate layer shape may connect the lower layer shape to the upper layer shape. As an example, a M1-M2 via may contain a shape on M1, a shape on M2 and a shape on M12 connecting the M1 shape to the M2 shape. In some embodiments, the top pin figs may be ignored. Routing process 10 may further include extracting the routing topology, which is discussed in further detail below. Routing process 10 may analyze any connected aligned pins. Accordingly, target pins corresponding to source aligned pins that are connected with straight lines should be aligned. Routing process 10 may be configured to perform topology driven routing as discussed herein.

Referring now to FIG. 8, routing process 10 may be configured to extract a routing topology. FIG. 8 shows an example for preparing a layout. In operation, the process may include converting a path into one or more path segments as shown in step "A", and merging co-linear overlapping segments as shown in step "B". The process may also truncate one or more segments as shown in step "C" and trim one or more vertical segments as shown in step "D". The process may also split vertical segments as shown in step "E". The process may also extract one or more segments and via anchors as is discussed below in further detail.

Figure 9A:
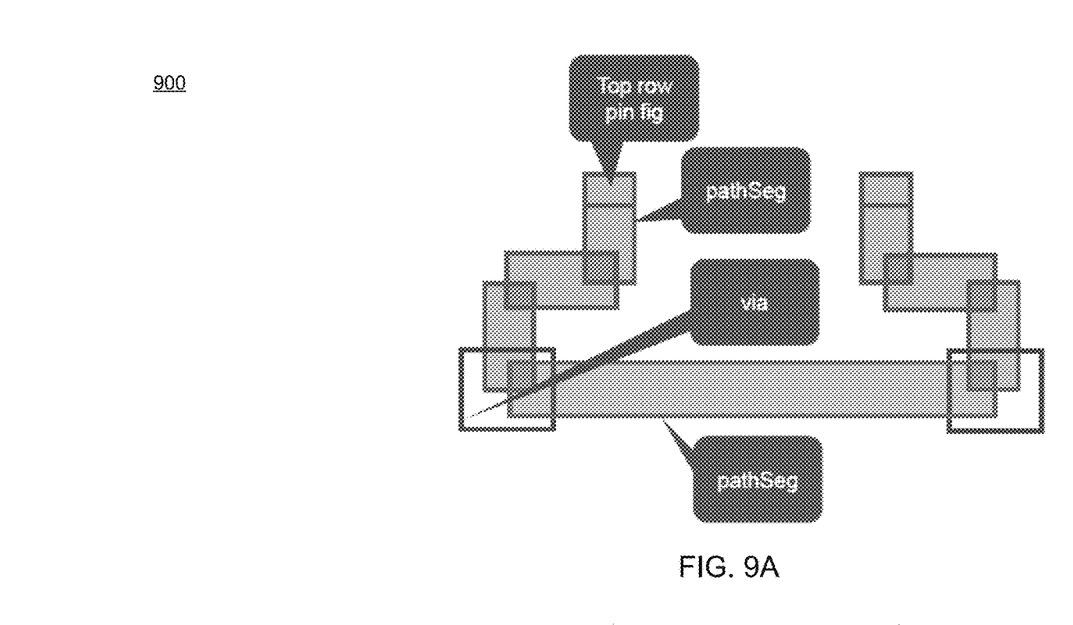
Figure 9B:
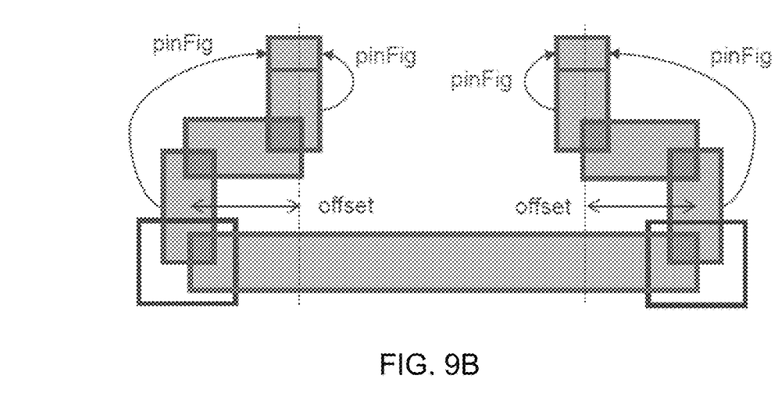
Figure 10A:
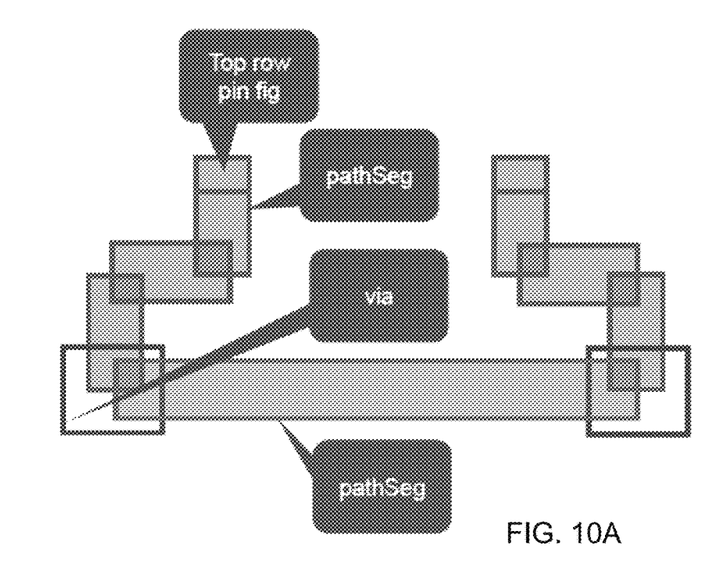
Figure 10B:
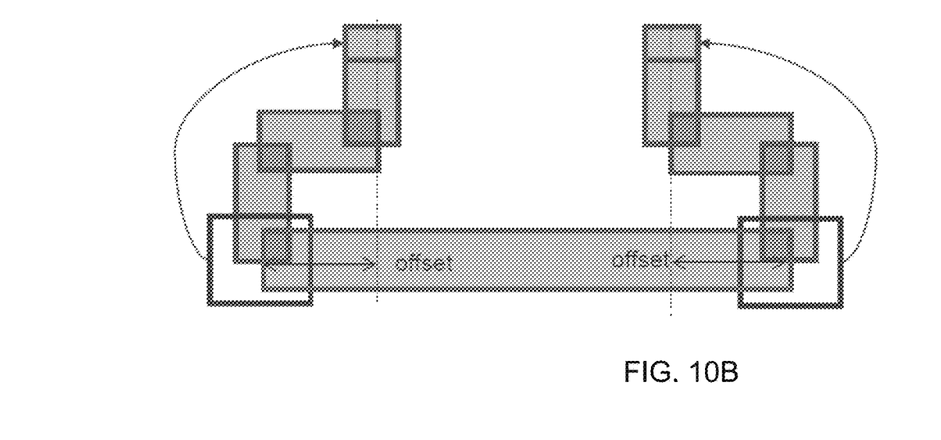
Figure 11A:
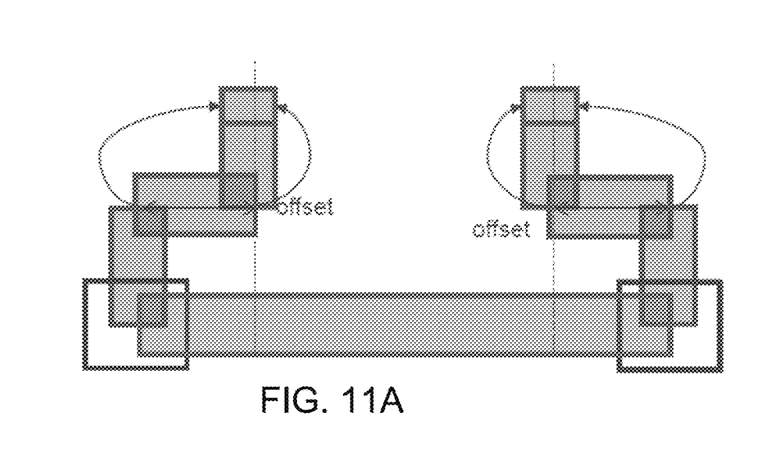
Figure 11B:
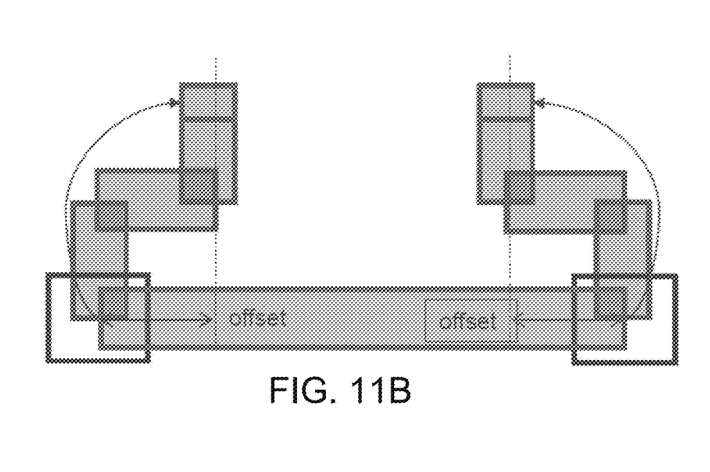
Figure 12A:
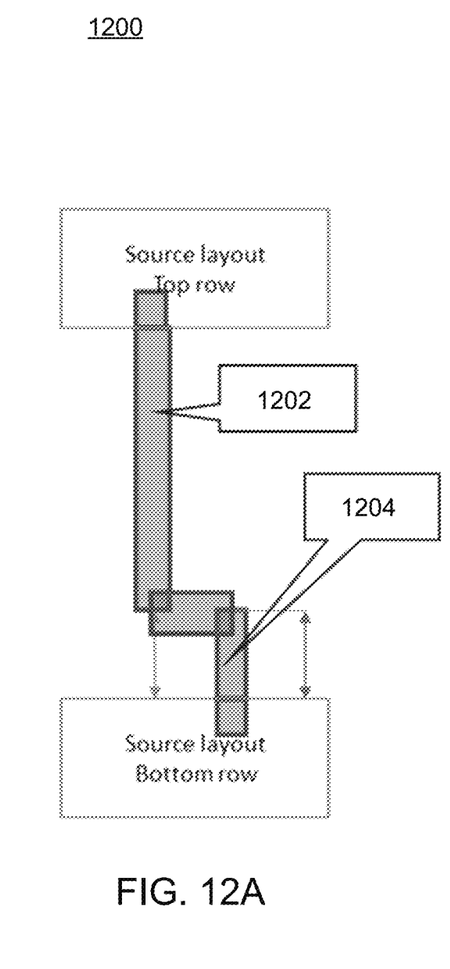
Figure 12B:
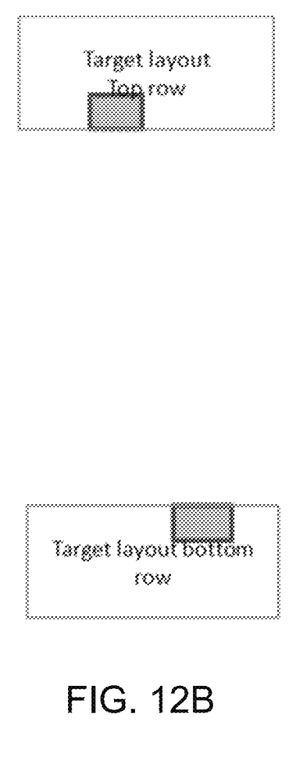
Figure 12C:
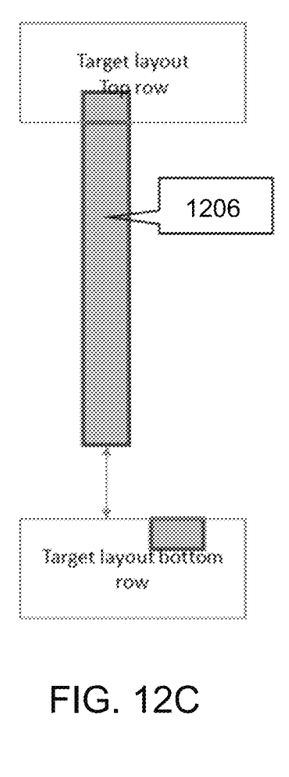
Figure 12D:
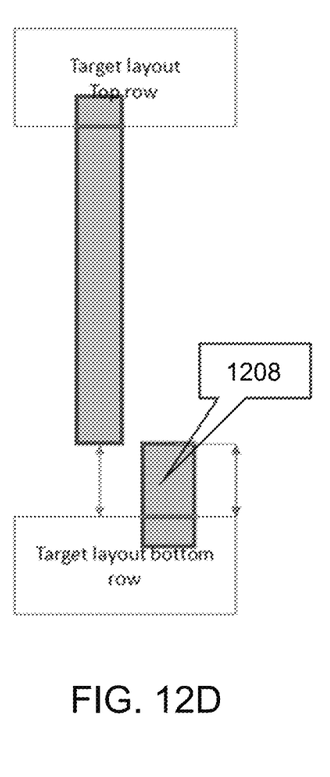

Referring now to FIGS. 9-11, embodiments of routing process 10 depicting examples of extracting segments and via anchors are provided. A vertical segment anchor is a pair of instance pin figs and offset as shown in FIG. 9. The anchor of the vertical segment may be composed of an instance pin fig and an offset. The instance pin fig is the closest connected instance pin fig to the segment. Here, "connected" indicates that it is connected to the same net as the segment. "Closest" indicates the instance pin fig with the smaller offset on the X axis. In this example, the offset refers to the distance (positive or negative) from the instance pin fig and the segment centerline. As shown in FIG. 10, a via anchor may correspond to a pair of instance pin figs and offset. The instance pin fig is the via closest instance pin fig connected to the via. Offset is the distance (positive or negative) from the instance pin fig and the via origin.

Referring now to FIG. 11, another example for extracting a routing topology showing the extraction of a segment and via anchor is provided. A horizontal segment anchor is a quadruplet composed of a segment left edge closest instance pin fig and offset and a segment right edge closest instance pin fig and offset. The horizontal segment is similar to the vertical segment, however, two anchors may be required, one for the left edge of the horizontal segment and one for the right edge of the horizontal segment.

Figure 13A:
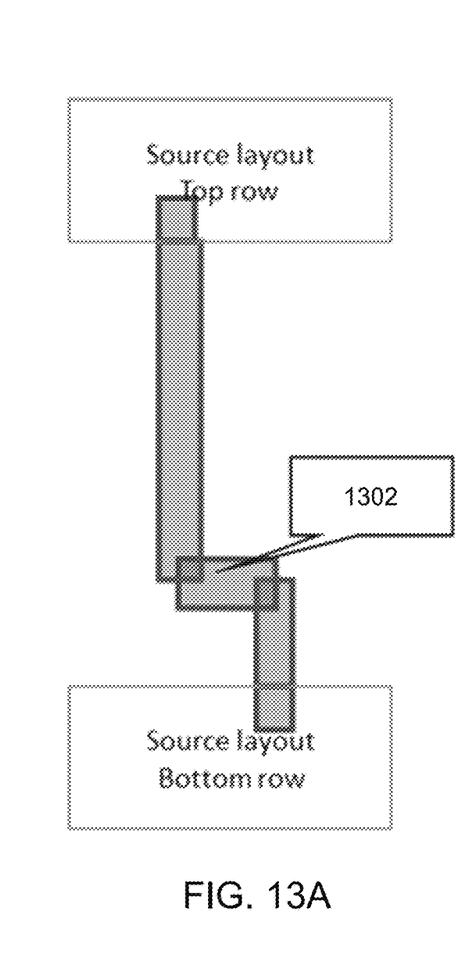
Figure 13B:
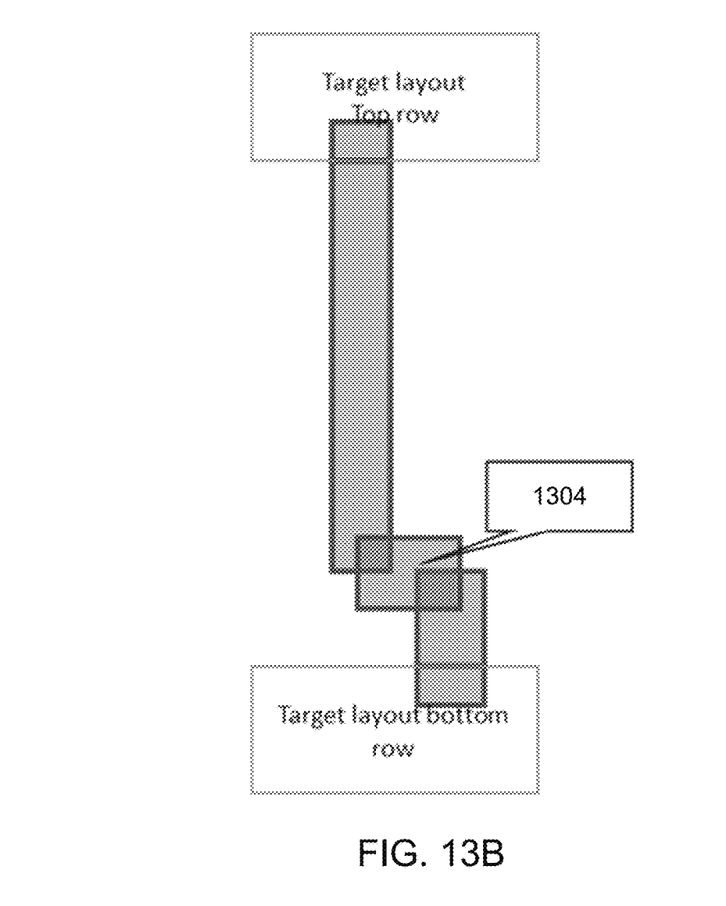
Figure 14A:
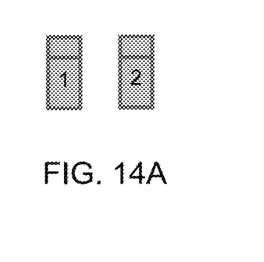
Figure 14B:
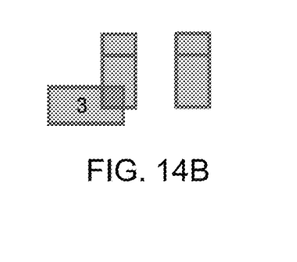
Figure 14C:
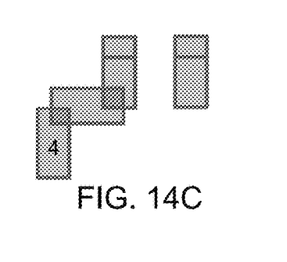
Figure 14D:
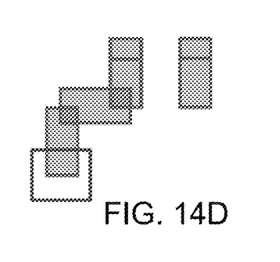
Figure 14E:
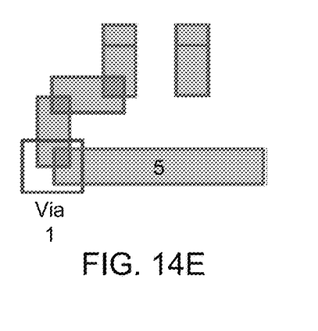
Figure 14F:
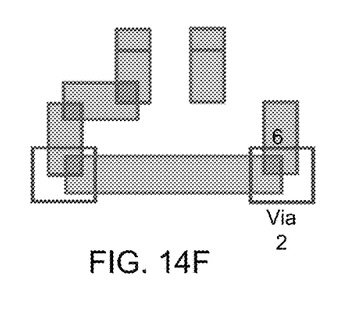
Figure 14G:
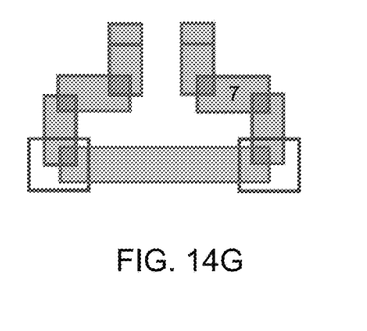

Referring now to FIGS. 12-13, example diagrams showing an example of topology driven routing associated with routing process 10 is provided. More specifically, these figures show how a router may route the target layout as the source layout. FIG. 12 shows how the router first creates the target vertical segments from the source vertical segments touching an instance pin fig. FIG. 12A shows the source layout and FIG. 12B shows the target layout before routing. FIG. 12C shows the intermediate result of the routing after the segment 1202 from the source layout got create as the segment 1206 within the target layout. Note that the spacing in between the bottom edge of the target segment and the top edge of the target bottom row is the same as the spacing in between the bottom edge of the source segment and the top edge of the source bottom row. FIG. 12D shows the intermediate result of the routing after the segment 1204 from the source layout got create as the segment 1208 within the target layout. Note the spacing in between the top edge of the target segment and the top edge of the target bottom row is the same as the spacing in between the top edge of the source segment and the top edge of the source bottom row.

Referring now to FIG. 13, an example diagram showing topology driven routing associated with routing process 10 is provided. FIG. 13 shows how a router may generate a horizontal segment once a vertical segment has been created. More specifically, it shows how source segment 1302 may be created as segment 1304 in the target layout.

Referring now to FIG. 14, an example diagram showing how a router may generate the different segments and vias, respecting the source topology presented in FIG. 11 is provided. In operation. The router may generate segments 1 and 2 as shown in step A. Segments 3 and 4 may be added in steps 3 and 4 respectively. Via 1 may be generated in step D and may be connected with a horizontal segment 5 and via 2 in steps E and F. Segments 6 and 7 may be generated in steps F and G.

In some embodiments, routing process 10 may distribute conflicting horizontal segments with respect to horizontal DRCs. Alternatively, with respect to vertical DRCs, the process may distribute conflicting vertical segments. This may be performed using any suitable approach, including, but not limited to, precedence graphs, etc.

As discussed above, embodiments of routing process 10 provide numerous advantages over existing approaches. These approaches are either entirely manual or force the user to call a router multiple times for a given cell (once for each net). The topology is not really specified as a real layout, but rather as an abstraction of a layout, which is very difficult for layout designers.

It will be apparent to those skilled in the art that various modifications and variations can be made in the embodiments of the present disclosure without departing from the spirit or scope of the invention. Thus, it is intended that embodiments of the present disclosure cover the modifications and variations of this invention provided they come within the scope of the appended claims and their equivalents.

What is claimed is:

1. A computer-implemented method comprising:
receiving a selection of an instance associated with an electronic design at an electronic design schematic;
selecting a corresponding instance within an electronic design layout displayed on a graphical user interface;
receiving a selection of a source topology from a plurality of stored routing topologies, wherein a routing topology refers to a way a set of instance geometries are physically connected together;
automatically extracting a routing topology prior to routing; and
routing at the electronic design layout displayed on the graphical user interface, based upon at least in part, the source topology.

2. The computer-implemented method of claim 1, wherein routing includes determining an equivalence between a source layout and a target layout.

3. The computer-implemented method of claim 2, further comprising:

analyzing layout routing topology to determine that only paths, path segments, and vias are included.

4. The computer-implemented method of claim 3, wherein automatically extracting the routing topology includes converting a path into one or more path segments.

5. The computer-implemented method of claim 3, wherein automatically extracting the routing topology includes merging co-linear overlapping path segments.

6. The computer-implemented method of claim 3, wherein automatically extracting the routing topology includes truncating path segments.

7. The computer-implemented method of claim 3, wherein automatically extracting the routing topology includes trimming or splitting one or more horizontal or vertical path segments.

8. The computer-implemented method of claim 3, wherein automatically extracting the routing topology includes extracting one or more path segments and via anchors.

9. The computer-implemented method of claim 3, further comprising:
analyzing an alignment of source and target pins.

10. A non-transitory computer-readable storage medium having stored thereon instructions that when executed by a machine result in the following operations:
receiving a selection of an instance associated with an electronic design at an electronic design schematic;
automatically selecting a corresponding instance within an electronic design layout displayed on a graphical user interface;
receiving a selection of a source topology from a plurality of stored routing topologies, wherein a routing topology refers to a way a set of instance geometries are physically connected together;
routing at the electronic design layout displayed on the graphical user interface, based upon at least in part, the source topology; and
analyzing layout routing topology to determine that only paths, path segments, and vias are included.

11. The non-transitory computer-readable storage medium of claim 10, wherein routing includes determining an equivalence between a source layout and a target layout.

12. The non-transitory computer-readable storage medium of claim 11, further comprising:
automatically extracting a routing topology prior to routing.

13. The non-transitory computer-readable storage medium of claim 12, wherein automatically extracting the routing topology includes converting a path into one or more path segments.

14. The non-transitory computer-readable storage medium of claim 12, wherein automatically extracting the routing topology includes merging co-linear overlapping path segments.

15. The non-transitory computer-readable storage medium of claim 12, wherein automatically extracting the routing topology includes truncating path segments.

16. The non-transitory computer-readable storage medium of claim 12, wherein automatically extracting the routing topology includes trimming or splitting one or more horizontal or vertical path segments.

17. The non-transitory computer-readable storage medium of claim 12, wherein automatically extracting the routing topology includes extracting one or more path segments and via anchors.

18. The non-transitory computer-readable storage medium of claim 12, further comprising:
analyzing an alignment of source and target pins.

19. A system comprising:
a processor configured to receive a selection of an instance associated with an electronic design at an electronic design schematic, the processor configured to allow for selection of a corresponding instance within an electronic design layout displayed on a graphical user interface, the processor further configured to receive a selection of a source topology from a plurality of stored routing topologies, wherein a routing topology refers to a way a set of instance geometries are physically connected together, the processor further configured to extract a routing topology prior to routing, the processor further configured to cause a routing at the electronic design layout displayed on the graphical user interface, based upon at least in part, the source topology.

20. The system of claim 19, wherein routing includes determining an equivalence between a source layout and a target layout.

* * * * *